T. C. Ball,
Tenoning Blind Slats.
Nº 18,569. Patented Nov. 10, 1857.
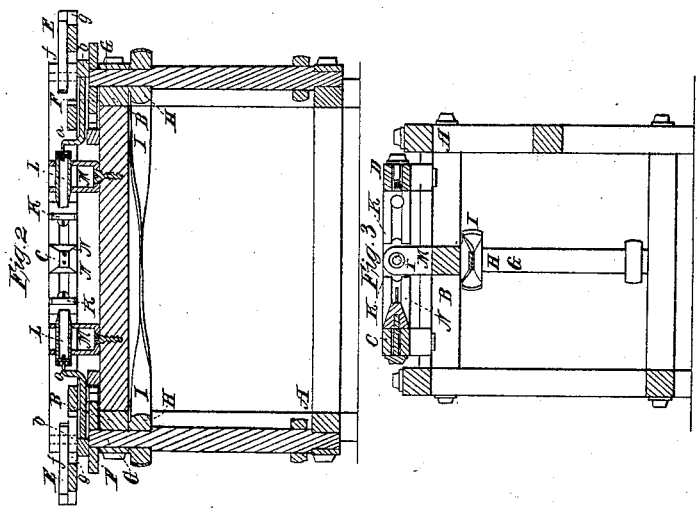
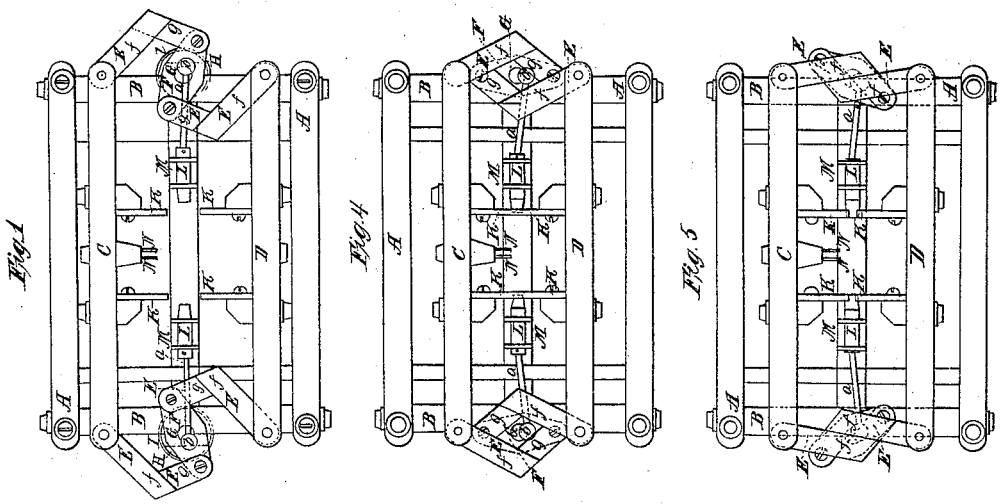

UNITED STATES PATENT OFFICE.

THOMAS C. BALL, OF KEENE, NEW HAMPSHIRE.

DEVICE FOR FORMING ROUND TENONS ON WINDOW-BLIND SLATS.

Specification of Letters Patent No. 18,569, dated November 10, 1857.

*To all whom it may concern:*

Be it known that I, THOMAS C. BALL, of Keene, in the county of Cheshire and State of New Hampshire, have invented a new and useful Machine for Forming Journals on Rotary Slats for Venetian Blinds and Pricking Staple-Holes in said Slats; and I do hereby declare that the same is fully described and represented in the following specification and the accompanying drawings, of which—

Figure 1 exhibits a top view of the said machine. Fig. 2, a vertical central and longitudinal section of it. Fig. 3 is a vertical, central and transverse section of it.

In these drawings A, is the framework of the machine, it being made with two transverse and parallel rails B, B, upon which rest and slide two carriages or bars C, D, which are arranged parallel to one another and in other respects as seen in the drawings. By means of four connecting rods E, E, E, E, disposed as seen in Figs. 1 and 2, and jointed to the carriages C, D, and to two levers F, F, fixed respectively on the upper ends of two vertical shafts G, G, the said carriages can be made simultaneously to approach toward or recede from each other whenever the two shafts are simultaneously put in rotation. On each shaft there is a pulley H, around both of which pulleys a crossed endless band I, travels.

Shoulder cutters K, K, K, K, are carried by and made to project from the two carriages C, D, as seen in the drawings, and to operate in connection with tubular sliding journal cutters, L, L, arranged as seen in Figs. 1, 2 and 3, and supported in stationary puppet heads M, M. To each of these latter cutters a longitudinal movement is given by means of a rod *a*, and a crank pin *b*, which connect the cutter with the adjacent lever F, and so that by the movement of said lever in such manner as to cause the two carriages to approach one another the cutter L, shall be moved toward the journal cutters.

Midway between the two shoulder cutters of one of the carriages, there are affixed to said carriage two awls or piercers N, N, so arranged as to be caused to puncture the edge of the blind slat, while the carriages are made to approach one another, the said awls or piercers being for the purpose of making the staple holes of the blind slat.

In operating with the above described machine, a slat is to be placed directly between the two journal cutters L, L, when they are at their greatest distance asunder, any suitable device or contrivance being used for supporting such slat in its proper position. This done, the two carriages are to be made to approach one another, so as to force the shoulder cutters simultaneously against opposite sides of the blind slat, and while they approach one another the tubular journal cutter or cutters will be forced forward or toward the shoulder cutters, and the two kinds of cutters coöperating will form upon the blind slat, the round journal or journals and the shoulders thereof. During the same the awls will pierce the holes for the staples. All this having been accomplished, the motions of the mechanism are next to be reversed, or its cutters caused to recede from one another until the blind slat is relieved from them and they are restored to a proper position for the application of another slat to the machine.

Each connecting rod E, is formed with an angular bend and with the longer part *f*, elevated above the shorter part, *g*, and so that when the two connecting rods of each lever, F, are moved toward one another the short part, *g*, of each rod shall pass underneath the longer part, *f*, of the other connecting rod. This mode of making the connecting rods or bars, E, causes the shoulder cutters to cut into the slat to the depth required, and next to recede a short distance from it before the journal cutter has completed its forward movement. This action of the shoulder cutters enables the shoulder and journal to be cut clean and without any bur or slivers being left at their junction. The positions of the parts of the machine when the shoulder cutters are closed are exhibited in the top view of the machine shown in Fig. 4, while Fig. 5 exhibits the positions of such parts immediately after the recession of the shoulder cutters and the journal cutters have been driven home to the shoulders, in which case the longer parts *f*, *f*, of the adjacent connecting bars, E, E, are brought into contact with each other.

I am aware that a machine for forming journals of blind slats and pricking the staple holes of such slats has been constructed with rotary hollow augers for forming the journals and shoulders. Such contrivances are objectionable, as they tear the wood more or less and leave it with ragged edges, which require to be reduced by other tools. My machine makes smooth journals and shoulders which require no subsequent finishing.

Now I do not claim the combination of machinery for pricking the staple holes and forming the journals and shoulders, but What I do claim as my improvement is—

The arrangement and combination of sliding shoulder cutters or their equivalents and sliding tubular journal cutters to operate together substantially as specified.

In testimony whereof, I have hereunto set my signature this tenth day of January, A. D. 1856.

THOS. C. BALL.

Witnesses:
R. H. EDDY,
F. P. HALE, Jr.